(12) United States Patent
Cudak et al.

(10) Patent No.: US 9,076,082 B1
(45) Date of Patent: Jul. 7, 2015

(54) PAUSING AND RESUMING A THREE-DIMENSIONAL PRINTJOB

(71) Applicant: International Business Machines Corporation, Armonk, NY (US)

(72) Inventors: Gary D. Cudak, Creedmoor, NC (US); Luis J. Flores, Houston, TX (US); Christopher J. Hardee, Raleigh, NC (US); Xiaoli Shi, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/108,403

(22) Filed: Dec. 17, 2013

(51) Int. Cl.
*G06K 15/00* (2006.01)

(52) U.S. Cl.
CPC ..................... *G06K 15/00* (2013.01)

(58) Field of Classification Search
USPC ....................................... 358/1.15
See application file for complete search history.

(56) References Cited

U.S. PATENT DOCUMENTS

| | | | |
|---|---|---|---|
| 2007/0291286 A1* | 12/2007 | Utsunomiya et al. | 358/1.8 |
| 2008/0024820 A1* | 1/2008 | Ohtomo | 358/1.15 |
| 2008/0228822 A1* | 9/2008 | Jarboe et al. | 707/104.1 |
| 2011/0045432 A1* | 2/2011 | Groscurth et al. | 433/75 |
| 2012/0105903 A1 | 5/2012 | Pettis | |
| 2013/0316081 A1 | 11/2013 | Kovalcik et al. | |

FOREIGN PATENT DOCUMENTS

| | | |
|---|---|---|
| JP | 200741840 A | 2/2007 |
| JP | 20086466 A | 1/2008 |
| KR | 20020060914 A | 7/2002 |
| WO | WO2013053004 A1 | 4/2013 |

OTHER PUBLICATIONS

Machine translation for JP 2008-006466, IDS, Jan. 17, 2008.*
Mizuno et al., "Maintenance System of Printer, Printer, Portable Terminal Server", JP2007041840A published Feb. 15, 2007 English text, 38 pages.
Idaka et al., "Laser Beam Machine, Laserbeam Machining Condition Setup Device . . . " JP2008006466A published Jan. 17, 2008 English text, 33 pages.
Ha, "System for Managing Production Point of Time Using Two-Dimensional Bar Code" KR20020060914A published Jul. 19, 2002 English text, 18 pages.
Yang, Qian, "U.S. Appl. No. 14/132,005 Office Action" Mail date: Dec. 4, 2014, 18 pages.

* cited by examiner

*Primary Examiner* — Qian Yang
(74) *Attorney, Agent, or Firm* — Jeffrey L. Streets

(57) ABSTRACT

A computer program product includes computer readable program code embodied on a computer readable storage medium. The computer program product comprises computer readable program code for beginning a print job on a three-dimensional printer to manufacture an object, computer readable program code for pausing the print job while the object is incomplete, computer readable program code for determining the state of the print job when the print job was paused, and computer readable program code for printing information onto the incomplete object, wherein the information includes an identification of the print job. The information preferably takes the form of a matrix barcode printed on a surface of the incomplete object that will later be overwritten.

20 Claims, 4 Drawing Sheets

PAUSING AND RESUMING A THREE-DIMENSIONAL PRINTJOB

BACKGROUND

1. Field of the Invention

The present invention relates to methods of three-dimensional printing.

2. Background of the Related Art

Three-dimensional (3D) printing is a process of making a three-dimensional object from a digital model using an additive process, where successive layers of material are laid down over previous layers. The material may be a thermoplastic polymer filament that is heated and extruded through a narrow nozzle. Either the nozzle is moved or a table supporting the material is moved to control where the material is deposited.

3D printing is becoming a big industry with a growing number of printer manufacturers and web sites that provide construction plans for downloading to a computer. Unfortunately, 3D printing is much more complex than 2D printing are requires much more time to product an object. Objects that are printed at a fine level of detail and are not tiny can take many hours to complete. Ideally, a 3D print job is not started unless there is enough time and materials to complete the job. However, work schedules, power outages, material shortages and the like may prevent a 3D print job from proceeding straight through from start to finish.

Some printers allow you to pause printing and resume, as long as you leave the printer on and don't move the object that is a work-in-progress. Accidentally moving the incomplete object relative to the table will cause the rest of the print job to be misaligned with the initial part of the object. However, a 3D print job may need to be paused in order to change or replace a plastic filament that is used to make the object or to simply stop and complete the job at a later time.

BRIEF SUMMARY

One embodiment of the present invention provides a computer program product including computer readable program code embodied on a computer readable storage medium. The computer program product comprises computer readable program code for beginning a print job on a three-dimensional printer to manufacture an object, computer readable program code for pausing the print job while the object is incomplete, computer readable program code for determining the state of the print job when the print job was paused, and computer readable program code for printing information onto the incomplete object, wherein the information includes an identification of the print job and the state of the print job.

DETAILED DESCRIPTION

Figure 1:
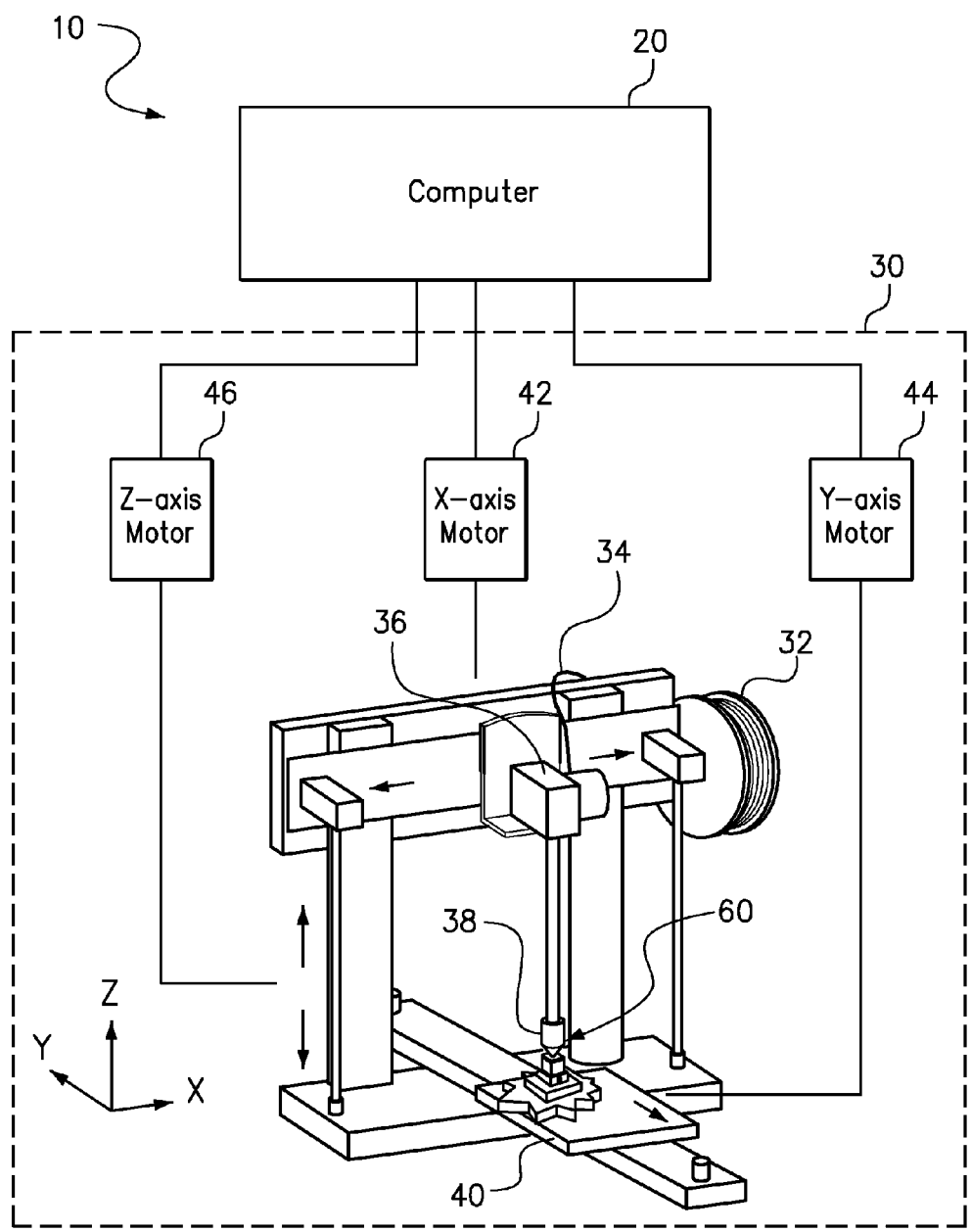
FIG. 1 is a diagram of a computer controlling a three-dimensional printer.

One embodiment of the present invention provides a method comprising beginning a print job on a three-dimensional printer to manufacture an object, pausing the print job while the object is incomplete, determining the state of the print job when the print job was paused, and printing information onto the incomplete object, wherein the information includes an identification of the print job and the state of the print job.

In one option, the method may further comprise encoding the information into a barcode (such as a matrix barcode or quick response (QR) barcode), wherein printing the information onto the incomplete object includes printing the barcode onto the incomplete object. Similarly, the information may be associated with any unique identifier printed on the incomplete object, perhaps as simple as a number or symbol. The unique identifier is associated with print job details stored in a record accessible to the computer or printer. Accordingly, the unique identifier is read and then used to lookup information about the print job. As used herein, the term barcode is intended to encompass any type of barcode, include traditional barcodes (such as UPC-A standard barcodes), matrix barcodes, and other symbology. While a barcode is typically considered to be a two-dimensional code, printing a barcode with a plastic material results in raised portions or bars such that the code takes on a three-dimensional character.

In a further option, the information is printed on the incomplete object in an area that will be overwritten when the print job resumes. Accordingly, the information may not appear on the completed object. The information may be printed on the incomplete object using the same material that is being used to manufacture the object. When the print job is resumed, the printer will preferably consider the raised areas of the information or QR code. In another option, the information may be printed on an area of the incomplete object that is oriented toward a front of the three-dimensional printer, or in a direction or orientation where a fixed camera can view and read the information.

The information printed onto the incomplete object may be enough information to resume the print job without duplicating any of the construction. Accordingly, the information may include an identification of the print job and the state of the print job, where the identification of the print job identifies a print file, and the state of the print job identifies the point in the print file where the print job was paused. A print job differs from a print file in that there is a unique print job each time a print file is submitted for printing. The information printed on the incomplete object may also include print options that were used for printing the incomplete object. For example, print options may include a print resolution.

Alternatively, the information printed onto the incomplete object may be any unique identifier that the computer or printer can read and associate with a record stored in memory accessible to the computer or printer. The unique identifier may, without limitation, be selected from a barcode or a code made up of alphabetic characters, numerals, or both. The stored record associated with the unique identifier would also include an identification of the print file, the state of the print job, and any print options that were used for printing the incomplete object. Accordingly, when the incomplete object is returned to the printer, the printer or computer may use a camera to read the unique identifier and then use the unique identifier to recall the associated record that contains all of the information needed to resume the print job.

In another embodiment of the method, the information may be periodically printed onto the incomplete object without receiving a pause instruction. Accordingly, at one or more stages of printing, the information is printed onto the incomplete object as a precaution in case the printing is paused or otherwise interrupted.

When a print job has been paused, the incomplete object may be removed from the three-dimensional printer. Accordingly, the three-dimensional printer may be used to print another print job before returning the incomplete object to the printer to be completed. Alternatively, other processing may be performed on the incomplete object after pausing the print job and before resuming the print job. For example, the other processing may include inserting a part into the incomplete object.

Embodiments of the present invention may further include returning the incomplete object to the three-dimensional printer, reading the information printed on the incomplete object, and resuming the print job using the information printed on the incomplete object and a copy of the print file stored in memory accessible to the three-dimensional printer. The information preferably includes the identification of the print file, the state of the print filed at which the print job was paused, and the print options used in printing the incomplete object. Preferably, the information printed on the incomplete object may be read by a camera, which is optionally secured to the three-dimensional printer.

In various embodiment, the information printed on the incomplete object may be used to determine the alignment of the incomplete object within the printer when the incomplete object is returned to the printer. Alternatively, a separate alignment marker may be printed on the incomplete object, wherein the alignment marker is used to determine the alignment of the incomplete object in the three-dimensional printer. It may be preferred to always print the information or an alignment marker in a particular orientation and always return the incomplete object to the printer in the same orientation. However, it is also possible to return the incomplete object to the printer in any orientation, read the information or alignment marker to determine the orientation of the incomplete object, and convert the print job instructions to use the new orientation.

In a further embodiment, the method may further include establishing stop points within the print job, wherein pausing the print job allows the print job to continue to the next stop point in the print job. A stop point is a point within the program code of the print file that may represent a particularly good point in the process for stopping the print job. For example, a stop point may be selected where a particularly complex portion of the object has been finished, where there is a planned substitution of the plastic filament, or where there is a suitable surface for printing the information where the information is subsequently printed over. One method may allow selection of a stop point that is after the next stop point at which to pause the print job. Accordingly, when a user is pausing the print job, they may also select which stop point should be used for pausing the print job.

A non-limiting hypothetical example is provided, as follows, to illustrate how the present invention may be beneficially used. Bob just started printing a large model on his 3D printer, which should take around 14 hours, given the printing resolution he is using. After 5 hours, he realizes he needs to print another, small piece to complete a project he is working on, but does not want to wait the remaining 9 hours or waste the existing progress on the model. So Bob pushes the pause button, which causes the printer to reach a stop point and print the state of the print job on the printed object for later use. After printing the small object, he places the large model back on the printer and causes the printer to resume. The printer reads and uses the state information on the model in order to continue making the large model as the point where it left off.

Another embodiment of the present invention provides a computer program product including computer readable program code embodied on a computer readable storage medium. The computer program product comprises computer readable program code for beginning a print job on a three-dimensional printer to manufacture an object, computer readable program code for pausing the print job while the object is incomplete, computer readable program code for determining the state of the print job when the print job was paused, and computer readable program code for printing information onto the incomplete object, wherein the information includes an identification of the print job and the state of the print job.

The foregoing computer program products may further include computer readable program code for implementing or initiating any one or more aspects of the methods described herein. Accordingly, a separate description of the methods will not be duplicated in the context of a computer program product.

FIG. 1 is a diagram of a system 10 including a computer 20 controlling a three-dimensional printer 30. This three-dimensional printer 30 includes a filament spool 32 for supplying a plastic filament 34 into an extruder 36. The heated plastic is pushed through a nozzle 38 onto a print bed or table 40 where the object is printed. As shown, the object 60 has already received a number of layers of plastic material, such that the nozzle is some distance above the table 40.

The position of the tip of the nozzle 38 determines where a thin layer of the plastic material will be placed. As the plastic passes through the nozzle 38, the nozzle 38 may be moved back and forth along an X-axis by an X-axis motor 42, and the table 40 may be moved back and forth along a Y-axis by a Y-axis motor 44. As each layer has been completed in the X-Y plane, the table may be moved down along a Z-axis by a Z-axis motor 46 so that another layer of the plastic may be applied through the nozzle moving in along the X-axis while the object or work piece is moved along with the table along the Y-axis. The printer also includes structural members that guide the nozzle along the X-axis, guide the table along the Y-axis, and guide the table along the Z-axis. The computer 20 provides instructions to the printer 30 to operate the X-axis motor 42, the Y-axis motor 44, and the X-axis motor 46 in a manner that positions the nozzle 38 where is can progressively build the object.

Figure 2:
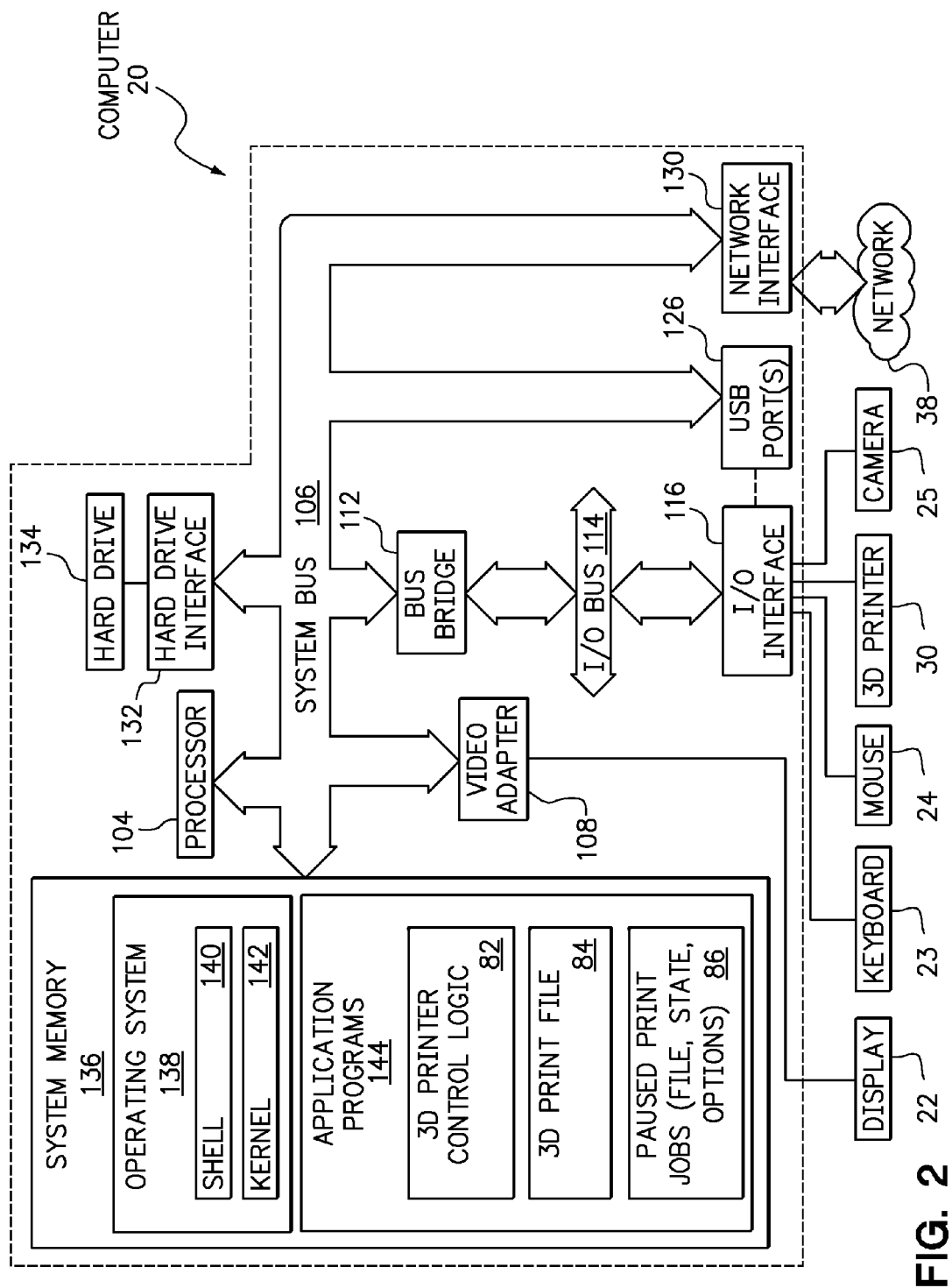
FIG. 2 is a diagram of a computer according to one embodiment of the present invention.

FIG. 2 is a diagram of an exemplary computer 20 that may be used in accordance with one embodiment of the present invention. The computer 20 includes a processor unit 104 that is coupled to a system bus 106. Processor unit 104 may utilize one or more processors, each of which has one or more processor cores. A video adapter 108, which drives/supports a display 22, is also coupled to system bus 106. The system bus 106 is coupled via a bus bridge 112 to an input/output (I/O) bus 114. An I/O interface 116 is coupled to I/O bus 114. I/O interface 116 affords communication with various I/O devices, including a keyboard 23, a mouse 24, a camera 25 and a 3D printer 30. The I/O devices may optionally include storage devices, such as CD-ROM drives and multi-media interfaces, other printers, and external USB port(s). While the format of the ports connected to I/O interface 116 may be any known to those skilled in the art of computer architecture, in a preferred embodiment some or all of these ports are universal serial bus (USB) ports. As depicted, the computer 20 is able to communicate over a network 38 using a network interface 130. The network 38 may be an external network, such as the global communication network, and perhaps also an internal network such as an Ethernet LAN or a virtual private network (VPN).

A hard drive interface 132 is also coupled to system bus 106 and interfaces with a hard drive 134. In a preferred embodiment, the hard drive 134 populates a system memory 136, which is also coupled to system bus 106. System memory is defined as a lowest level of volatile memory in computer 100. This volatile memory includes additional higher levels of volatile memory (not shown), including, but not limited to, cache memory, registers and buffers. Data that populates system memory 136 includes the computer's operating system (OS) 138 and application programs 144.

The operating system 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, the OS 138 also includes a kernel 142, which includes lower levels of functionality for OS 138, including providing essential services required by other parts of OS 138 and application programs 144, including memory management, process and task management, disk management, and mouse and keyboard management. The application programs 144 in the system memory of the computer 20 may include various programs and modules for implementing the methods described herein, such as the 3D printer control logic 82, the 3D print files 84, and the paused print jobs 86 (each print job including identification of a print file, state at which the print job was paused, and any print options used during printing).

The hardware elements depicted in computer 20 are not intended to be exhaustive, but rather are representative components suitable to perform the processes of the present invention. For instance, computer 20 may include alternate memory storage devices such as magnetic cassettes, digital versatile disks (DVDs), Bernoulli cartridges, and the like. These and other variations are intended to be within the spirit and scope of the present invention.

Figure 3A:
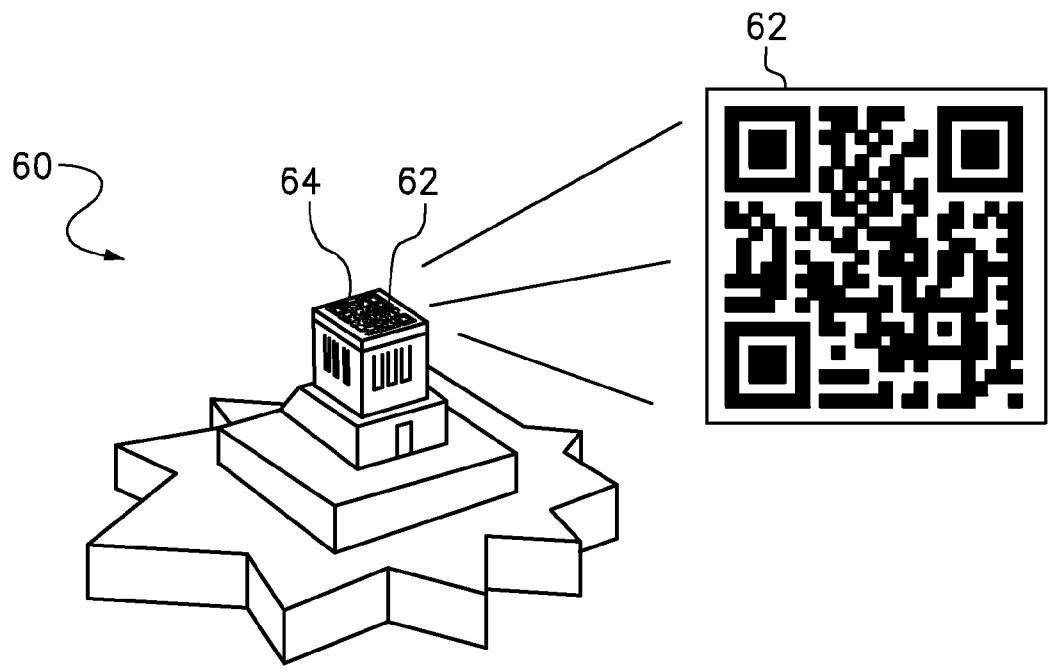
FIG. 3A is a diagram of an incomplete object having a matrix barcode printed on the incomplete object.

FIG. 3A is a diagram of an incomplete object 60 (i.e., the base of the Statue of Liberty) having a matrix barcode 62 printed on a surface 64 of the incomplete object. The matrix barcode 62 has been enlarged and shown to the right. Information about the print job may be encoded into the matrix barcode 62, such as a unique print job identification. In some embodiments, the information may actually identify the print job by a print file, state of execution of the print file when paused, and any print option used during the print job. Furthermore, one or more elements of the matrix barcode 62 may also serve as an alignment marker so that the printer can determine the orientation of the object 60 upon its return into the printer.

Figure 3B:
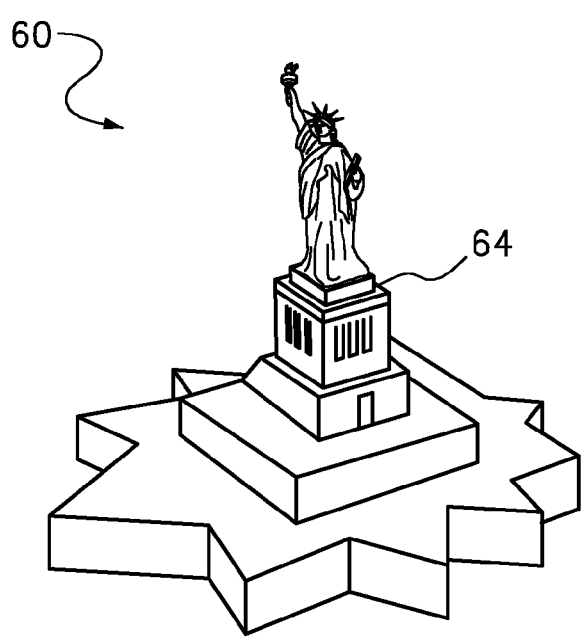
FIG. 3B is a diagram of a completed object having overwritten the matrix barcode.

FIG. 3B is a diagram of a completed object 60 (i.e., the entire Statue of Liberty) having overwritten the matrix barcode (see barcode 62 in FIG. 3A). Preferably, when the print job is resumed, the printer will fill in the gaps between the raised portions of the matrix barcode 62 that was printed on the surface 64. As a result, no material is wasted and the matrix barcode does not appear on the completed object.

Figure 4:
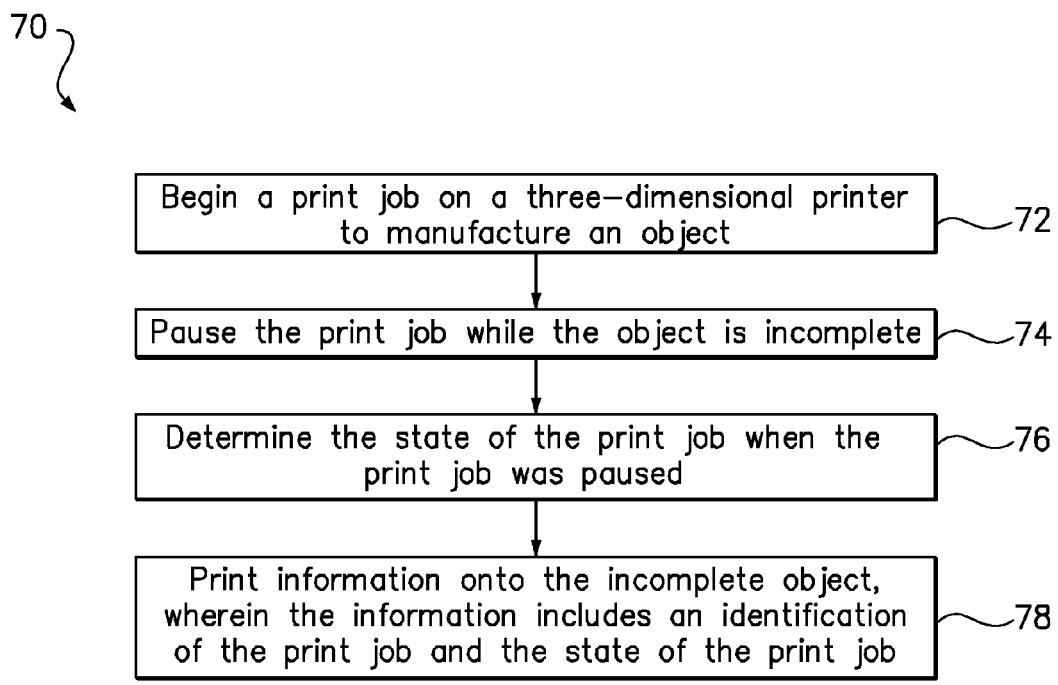
FIG. 4 is a flowchart of a method in accordance with one embodiment of the present invention.

FIG. 4 is a flowchart of a method 70 in accordance with one embodiment of the present invention. In step 72, the method begins a print job on a three-dimensional printer to manufacture an object. In step 74, the print job is paused while the object is incomplete. The method then, in step 76, determines the state of the print job when the print job was paused, and prints information onto the incomplete object in step 78, wherein the information includes an identification of the print job and the state of the print job.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer program product including computer readable program code embodied on a non-transitory computer readable storage medium, the computer program product comprising:
   computer readable program code for beginning a print job on a three-dimensional printer to manufacture an object;
   computer readable program code for pausing the print job while the object is incomplete;
   computer readable program code for determining the state of the print job when the print job was paused; and
   computer readable program code for printing information onto the incomplete object, wherein the information includes an identification of the print job and the state of the print job.

2. The computer program product of claim 1, further comprising:
   computer readable program code for encoding the information into a barcode, wherein the computer readable program code for printing the information onto the incomplete object includes computer readable program code for printing the barcode onto the incomplete object.

3. The computer program product of claim 1, wherein the information printed on the incomplete object includes print options that were used for printing the incomplete object.

4. The computer program product of claim 3, wherein the print options include a print resolution.

5. The computer program product of claim 1, wherein the information is printed on the incomplete object in an area that will be printed over when the print job resumes.

6. The computer program product of claim 5, wherein the information is printed on the incomplete object using the same material that is being used to manufacture the object.

7. The computer program product of claim 1, wherein the information is printed on an area of the incomplete object that is oriented toward a front of the three-dimensional printer.

8. The computer program product of claim 1, further comprising:
   computer readable program code for storing the information in a memory accessible to the three-dimensional printer in association with a print job identifier.

9. The computer program product of claim 1, wherein the information is periodically printed onto the incomplete object without receiving a pause instruction.

10. The computer program product of claim 1, further comprising:

computer readable program code for printing another object on the three-dimensional printer after removing the incomplete object.

11. The computer program product of claim 10, further comprising:
computer readable program code for reading the information printed on the incomplete object after returning the incomplete object into the three-dimensional printer; and
computer readable program code for resuming the print job using the information read from the incomplete object and a copy of the print file stored in memory accessible to the three-dimensional printer.

12. The computer program product of claim 11, wherein the information includes the identification of the print file, the state of the print filed at which the print job was paused, and the print options used in printing the incomplete object.

13. The computer program product of claim 11, wherein the information printed on the incomplete object is read by a camera.

14. The computer program product of claim 11, wherein the information printed on the incomplete object is used to determine the alignment of the object within the printer.

15. The computer program product of claim 11, further comprising:
computer readable program code for printing an alignment marker on the incomplete object, wherein the alignment marker is used to detect the alignment of the incomplete object in the three-dimensional printer.

16. The computer program product of claim 15, further comprising:
computer readable program code for detecting a position of the alignment marker and determining whether the alignment marker indicates that the incomplete object is in a predetermined position.

17. The computer program product of claim 16, further comprising:
computer readable program code for repositioning the incomplete object within the printer so that the alignment marker indicates that the incomplete object is located in a predetermined position or directed in a predetermined direction.

18. The computer program product of claim 1, further comprising:
computer readable program code for establishing stop points within the print job, wherein pausing the print job allows the print job to continue to the next stop point in the print job.

19. The computer program product of claim 18, wherein the stop points provide a suitable surface for printing the information.

20. The computer program product of claim 18, further comprising:
computer readable program code for selecting a stop point after the next stop point at which to pause the print job.

* * * * *